Feb. 12, 1935.   B. W. FREEMAN   1,990,599
ORNAMENTING MACHINE
Original Filed Sept. 17, 1931   3 Sheets—Sheet 1

Inventor
Benjamin W. Freeman
By Riordan & Riordan
Attorney

Feb. 12, 1935.  B. W. FREEMAN  1,990,599
ORNAMENTING MACHINE
Original Filed Sept. 17, 1931   3 Sheets-Sheet 2

Inventor
Benjamin W. Freeman,
By Riordan & Riordan
Attorney

Feb. 12, 1935. B. W. FREEMAN 1,990,599
ORNAMENTING MACHINE
Original Filed Sept. 17, 1931 3 Sheets—Sheet 3
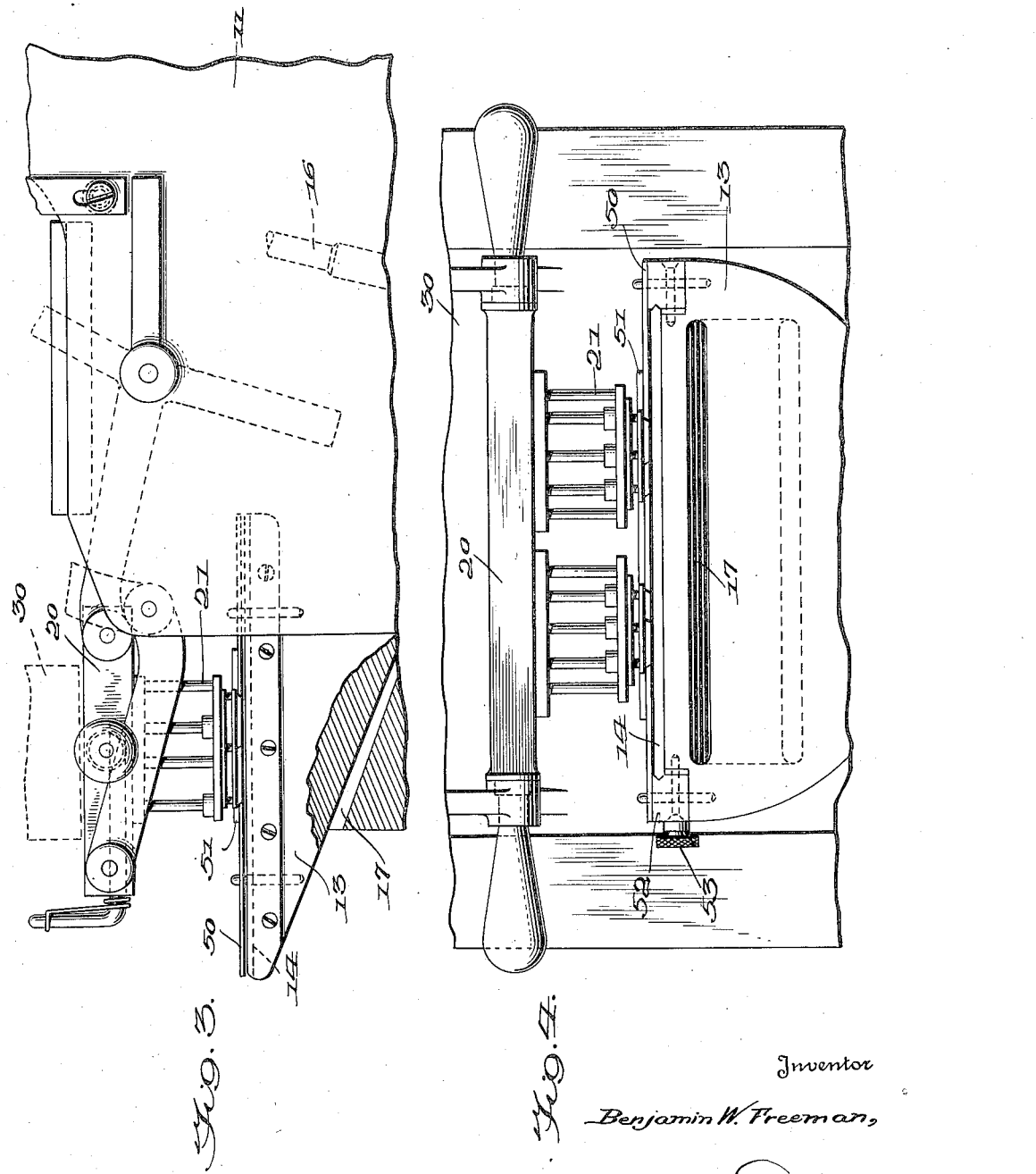
Inventor
Benjamin W. Freeman,
By Riordan & Riordan
Attorney Patented Feb. 12, 1935

1,990,599

UNITED STATES PATENT OFFICE 1,990,599

ORNAMENTING MACHINE

Benjamin W. Freeman, Cincinnati, Ohio

Original application September 17, 1931, Serial No. 563,430. Divided and this application November 10, 1934, Serial No. 752,501

14 Claims. (Cl. 164—93)

This invention relates to improvements in shoe ornamenting machinery, the present application being a division of a copending application, Serial No. 563,430, filed September 17th, 1931.

More particularly the invention relates to a work supporting arrangement for machines in which the work is ornamented either in part or entirely by a perforating or cutting-out operation performed thereon, by a suitable die.

An embodiment of the machine as disclosed in said copending application is directed to combined marking and cutting operations in which the work is marked with an ink or pigment at the same time, or as a part of a continuous cycle of operations during which the work is ornamented by perforating or cutting out a design therein, the machine being well adapted for operation upon skins, upper blanks, fitted and closed uppers or the like.

These machines utilize a work support, normally held in a fixed position relative to a frame of the machine, but which is adaptable to movement if convenience desires and which support is provided with a flat surface for the accommodation of flat work, such as skins and shoe blanks, but which may be shaped to accommodate ring-like shoe parts, such as closed or fitted uppers.

When operating upon fitted work, it is important that a clearance be provided around the work support, in order to properly drape the work thereabout, while maintaining that portion of the work upon which an operation is to be performed flat and smooth across the surface of the support, and to this end the work support is anvil shaped; i. e., provided with a horn projected therefrom.

Means are provided for moving a die into and out of operative engagement with the work, which means preferably is operated by power, although it is contemplated that the machine may be readily adapted to the use of manual or treadle operating means in lieu of a power mechanism, if found desirable.

The anvil or work support is usually surfaced with a protective backing member of softer material than the cutting edges of the die, and in order to ensure clean cut operations in the work, a strip of backing material such as heavy paper is fed over the work support, beneath the work, a feed mechanism for moving the web or strip intermittently being provided. There is no particular difficulty in feeding such a web over a work support adapted solely for flat work, but when operating upon fitted work, and keeping in mind the need for a clearance about the work support, it is important that the backing material be directed through a path such as not to defeat the purpose of the clearance about the work support, and an important object of the present invention relates to such an arrangement.

Another object resides in the provision of means, whereby the backing member of relatively soft material with which the work support is surfaced, may be adjusted in the event that it becomes scored by the cutting edges of the ornamenting die.

Still another object contemplates the provision of means associated with or mounted upon the work support for positioning the work in a proper location of alignment with the ornamenting die thereby insuring accuracy in the operation of the machine.

To the attainment of the foregoing and other objects which will appear as the description proceeds, reference may be made to the accompanying drawings, in which Fig. 1 is a side elevation of the machine;

Fig. 3 is an enlarged fragmentary side elevation, partly in section, illustrating a slightly modified work support; and Fig. 4 is an enlarged fragmentary front elevation of the structure shown in Fig. 3.

Figure 1:
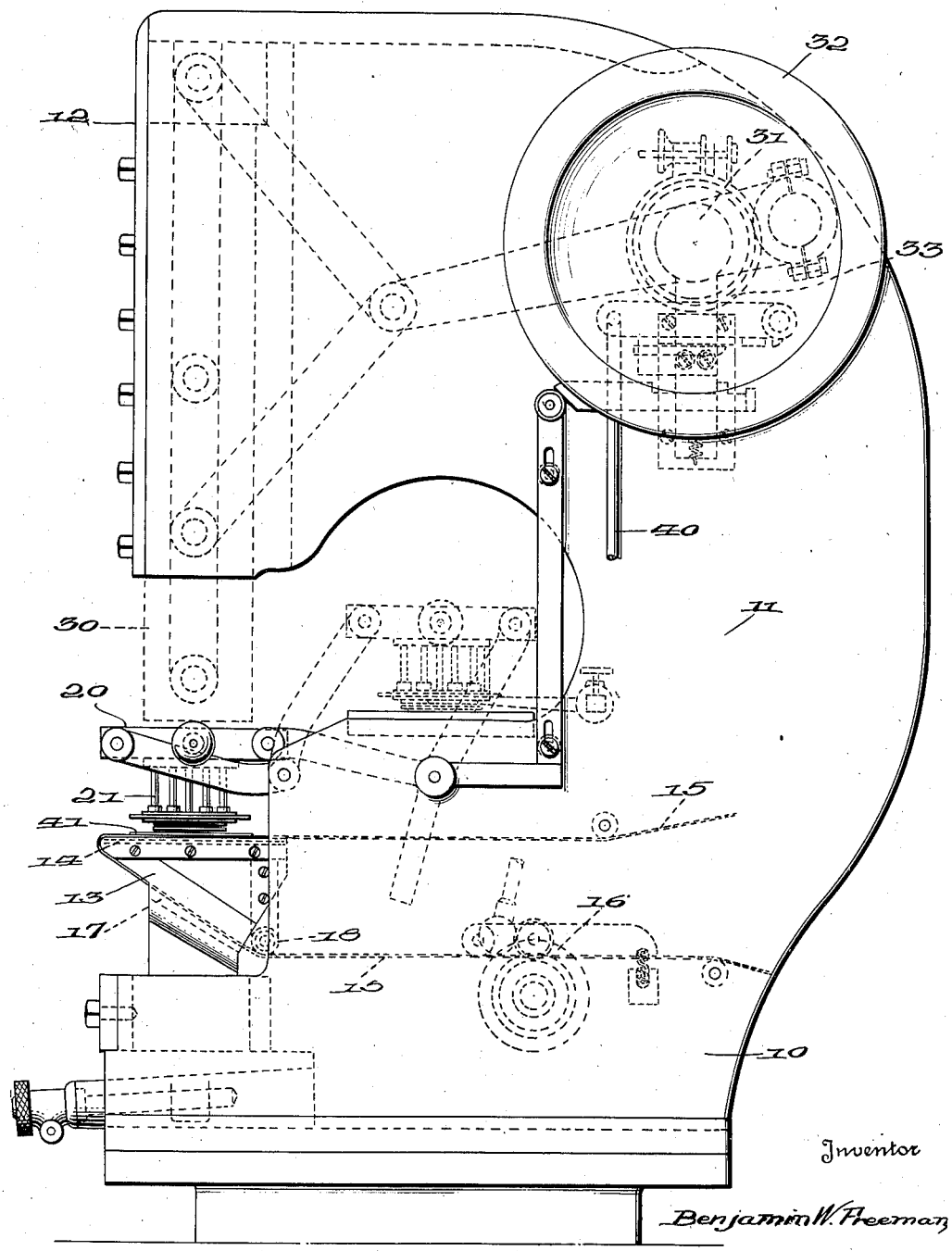

Referring more specifically to the drawings, in which like reference numerals designate like parts, it will be observed that the machine comprises generally a base 10, having an upwardly extending frame or casing 11, which terminates in a head portion 12 overhanging the front part of the base to provide an enclosure or throat within which is mounted a work support or anvil 13. The anvil may be provided with a plate 14 providing a work supporting surface, and a protective backing for the cutting edges of the die, the plate being made of brass, soft steel or other material softer than the cutting edges of the die, such as rubber composition, fiber or the like.

When the plate 14 has been struck by the die a number of times it may become scored or indented and in order to avoid poor work, the plate 14 is made shiftable so that different surface positions can be presented. To this end a clamp 52 is utilized, this clamp being held in position by a set screw 53. By loosening the set screw the clamp 52 releases its hold on the plate 14, which may then be shifted as desired.

A strip of backing paper 15 is fed step by step over the plate 14, a feed mechanism 16 being provided for the purpose, the function of the paper being to ensure a clean cut in the work. Normally, the die will penetrate but part way of the paper, but if for any reason it should cut completely through, the edges thereof will be protected by the plate 14.

In order to maintain the clearance about the work support, for draping fitted work, it is important that the path of the backing material 15 be such as not to block the clearance, and to this end the anvil is cored-out at 17 and the backing paper disposed to travel across the upper surface of the anvil, that is, over the plate 14, down and under the horn of the anvil, through the slot or cored-out portion 17 over an idler roll 18, and thence to the feed mechanism 16, it being understood that this web is drawn from a supply roll not shown, and is fed to a rewind roll not shown, such rolls being well known in the art and conveniently located on the frame of the machine. With this arrangement, the paper closely follows the contour of the anvil and does not in any manner interfere with placement of the work thereon, and draping of overhanging parts of the work within the clearance recesses.

The machine of the present embodiment is equipped with an ink marking and tracing die holder 20 to which a pair of die units 21 may be attached. The units include cutting edges and a plate having marking edges resiliently spaced in advance of the cutters. The marking plate may readily be the usual stripper, provided however, with marking elements.

A plunger 30 is mounted for vertical reciprocating movement in the head 12 of the machine, this plunger being connected by a crank arm and suitable linkage to a main power shaft 31. Power is supplied to the shaft by a continuously rotating pulley 32 which may be connected to the shaft by a single revolution clutch mechanism 33, under control of a treadle rod 40.

Depression of the treadle rod 40 actuates the clutch 33 thereby initiating actuation of the plunger 30. When the plunger 30 moves down it engages the die holder 20, forcing the die unit into ornamenting engagement with the work. The clutch 33 being a single revolution clutch will cause the shaft 31 to complete one revolution and return the plunger 30 to an inoperative position, whereupon the shaft will be declutched from the pulley 32.

Figure 2:
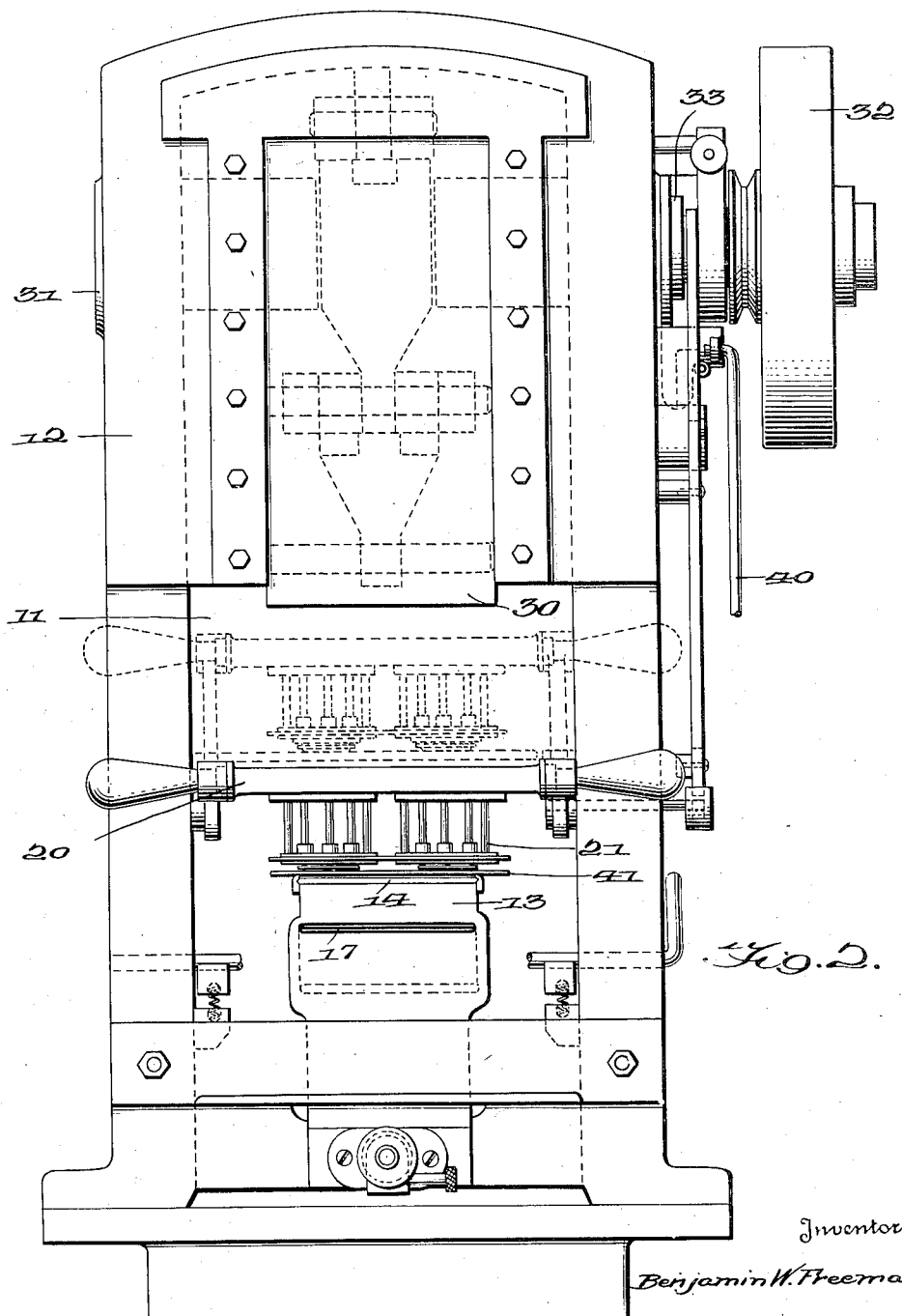
Fig. 2 is a front elevation thereof.

Suitable means are provided to ensure accurate positioning of the work on the support, a mask 41 being illustrated in Figs. 1 and 2 and a positioning plate 50 carrying solid edge gage abutments 51, being shown in Figs. 3 and 4. The elements 50 and 41 function similarly, one being more desirable for certain types of work than the other.

In Figs. 1 and 2, the support 13 and plate 14 are shaped to accommodate fitted work of relatively small size, although flat work may be treated thereon, and the mask 41 which may be hinged to the support, or may be carried by the die, or otherwise associated with the machine is utilized. In Figs. 3 and 4 the anvil is wider and mounts the auxiliary plate 50, to particularly adapt the structure to flat work or to larger sizes of fitted work.

The plate 50 can be used as a backing member, but it is not designed for adjustment as in the case of the plate 14, as that would change the location of the gages and hence the location of the work relative to the dies.

From the foregoing description the operation of the machine will be readily apparent. Work is placed upon the support and aligned with the die by means of the gage 41 or 50, the machine is treadled and the plunger descending, causes the die units 21 to ornament the work. Immediately thereafter the feeding mechanism 15, which is operated in synchronism with the other moving parts of the machine, feeds the paper a slight amount to present a fresh surface thereof for the next piece of work.

While the work support and arrangement of web of backing paper with respect thereto is described in connection with a combined marking and cutting unit, utilizing a tracing die holder, it is to be understood that such disclosure is but illustrative, as the work support and feed of paper through a cored-out portion thereof is readily adaptable to many different arrangements of die and die actuating means and accordingly the invention is not to be limited except as defined in the appended claims.

Having thus described my invention, what I claim as new and desire to secure by Letters Patent of the United States is:—

1. In a machine for ornamenting shoe parts, a support having a work receiving surface, said support being shaped to provide a clearance space below said surface, for the reception of portions of the work draped about the support, a web of backing material movable through said machine, and means to feed said material across said work supporting surface, over the edge thereof and back through said support, in substantial conformance to the configuration of said support.

2. In a machine for ornamenting shoe parts, a support having a work receiving surface, means associated with said support for accurately positioning a work piece on the support, said support being shaped to provide a clearance space below said surface, for the reception of portions of the work draped about the support, a web of backing material movable through said machine, and means to feed said material across said work supporting surface, beneath said work positioning means over the edge of said surface and back through said support, in substantial conformance to the configuration of said support.

3. In a machine for ornamenting shoe parts, a support having a work receiving surface, means carried by said support in slightly spaced relation to said surface for accurately positioning a work piece on the support, said support being shaped to provide a clearance space below said surface, for the reception of portions of the work draped about the support, a web of backing material movable through said machine, and means to feed said material between said surface and said work positioning means, over the edge of said surface and back through said support in substantial conformance to the configuration of said support.

4. In a machine for ornamenting shoe parts, a work support shaped to receive and support fitted uppers, a web of backing material movable through said machine, and means to feed said material across a surface of the work support, over the edge thereof and back through said support, in substantial conformance to the configuration of said support.

5. In a machine for ornamenting shoe parts, a work support shaped to receive and support fitted uppers, a web of backing material, and means to feed a run of said backing material across the work support in one direction, and another run thereof through the work support in an opposite direction while holding a connecting portion of the web between runs, against the support whereby the backing material will conform to the general configuration of that part of the support between said runs.

6. In an ornamenting machine of the type having a combined marking and cutting die unit operatively mounted therein, a work support, backing material movable over said backing support, and means to feed a run of said backing material across the work support in one direction, while holding a connecting portion of the web between runs, against the support, and another run thereof through the work support in an opposite direction whereby the backing material will conform to the general configuration of that part of the support between said runs.

7. In a machine of the class described, an anvil shaped work support provided with a reduced lower portion affording a clearance space below the operating surface of the support, backing material movable over said support, and means to feed said backing material across an upper surface of the work support, in one direction, about a forward portion thereof and through said support in substantially an opposite direction, thereby to maintain said backing material in substantial conformance to the configuration of said support.

8. In a machine of the class described, an anvil shaped work support having a projecting horn, a web of backing material positioned adjacent the operating surface of said support, and means to feed said backing material in one direction over the upper surface of said support, about the forward portion of said horn, and through the base of said support beneath the horn whereby to conform said material to the shape of the horn.

9. In a machine for ornamenting shoe parts, a work support shaped to receive and support fitted uppers, said support being shaped to provide a clearance space for portions of the upper which are not to be ornamented, backing material movable over said support, and means to feed said backing material beneath the upper on said support and over the surface of the support beneath the upper, about the edge and through the base of said support whereby to conform said material substantially to the shape of the clearance space.

10. In an ornamenting machine of the type having a combined marking and cutting die unit operatively mounted thereon, an anvil shaped work support having a projecting horn, shaped to receive and support a ring-like piece of work, a web of backing material, and means to feed said backing material in one direction over the upper surface of said support, beneath a work piece on said support, about the forward portion of said horn, and through said support beneath the horn whereby to conform said material to the shape of the horn.

11. A work support adapted for use in ornamenting machines comprising an anvil-shaped head having a projecting horn, and a base upon which said head is mounted, said head and horn being shaped to provide a clearance space about the head for the reception of ring-like work, said support being cored out from one side thereof to the other, below the working surface of said head, and adjacent said clearance space, whereby a web of backing material may be passed over the anvil shaped head and back through the cored out portion without blocking said clearance space.

12. In a machine having an ornamenting die for operating upon shoe parts, a support having a work receiving surface formed of material softer than the ornamenting instrumentalities of the die, said support being shaped to provide a clearance space below said surface, for the reception of portions of the work draped about the support, a web of backing material movable through said machine, and means to feed said material across said work supporting surface, over the edge thereof and back through said support, in substantial conformance to the configuration of said support.

13. In a machine having an ornamenting die for operating upon shoe parts, a support having an adjustable work receiving surface formed of material softer than the ornamenting instrumentalities of the die, releasable means to clamp said surface in an adjustable position with respect to said support, said support being shaped to provide a clearance space below said surface, for the reception of portions of the work draped about the support, a web of backing material movable through said machine, and means to feed said material across said work supporting surface, over the edge thereof and back through said support, in substantial conformance to the configuration of said support.

14. In a machine for ornamenting shoe parts, of the type having a substantially C-shaped frame defining a throat, an anvil like work support positioned substantially within said throat, said support having a projecting portion shaped to receive and support fitted uppers, a web of backing material movable through said throat, and means to feed said material across the operating surface of said support in one direction and through said support in a substantially opposite direction and about said projecting portion, whereby said backing material is maintained in substantial conformance to the configuration of the support.

BENJAMIN W. FREEMAN.